Nov. 3, 1931.   S. EVANS   1,830,649
TOOL CHUCK FOR WELDING
Filed July 5, 1928
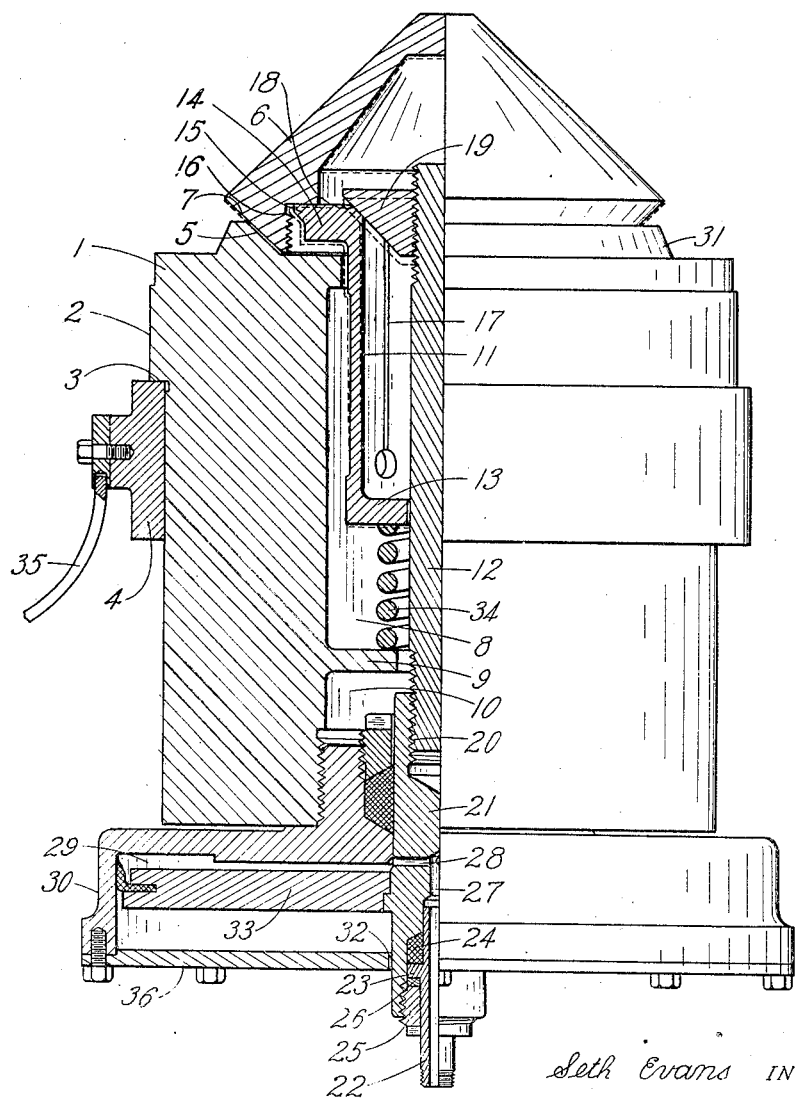
Seth Evans INVENTOR
BY Jesse R. Stone
ATTORNEY Patented Nov. 3, 1931

1,830,649

UNITED STATES PATENT OFFICE

SETH EVANS, OF HOUSTON, TEXAS, ASSIGNOR TO HUGHES TOOL COMPANY, OF HOUSTON, TEXAS, A CORPORATION OF TEXAS

TOOL CHUCK FOR WELDING

Application filed July 5, 1928. Serial No. 290,457.

My invention relates to chucks for holding tools particularly during operations for welding connected with said tools.

It is an object of the invention to provide a chuck which will grip and retain the tool during the welding operation in a simple and effective manner and which will also force said tool into close contact with the body of the device.

It is desired to provide a chuck for operation by means of a pressure fluid which will be automatically expanded and moved inwardly as the fluid pressure is employed, and which will automatically release when the fluid pressure is cut off.

It is also an object to provide a chuck adapted to interfit with the tool so that when the tool is gripped, it will be drawn into close contact with the body of the chuck, allowing free passage of an electric current from the chuck to the tool.

Referring to the drawing herewith, I have shown a side view partly in elevation and partly in central longitudinal section illustrating the construction of the chuck with the tool thereon.

In constructing the chuck, I employ a body 1 which is preferably of a conducting metal offering but small resistance to the passage of electric current. This body is approximately cylindrical in outline, the forward end of the same having a raised portion 2, thus providing a shoulder 3 against which a ring 4 of conducting material may abut.

The forward end of the chuck is provided with a seat 5 to receive the face of the tool 6 which is to be gripped by the chuck. In the present instance, a tool is shown having an approximately frusto-conical shape, the face of which is beveled at 7. The seat 5 is shaped to receive the beveled face of the cone 6, the forward face of the chuck having a ridge 31 projecting therefrom, the inner face of which forms the seat as described.

The interior of the chuck 1 is formed with a chamber 8 which has a partition 9 at the rearward side thereof separating it from a smaller chamber 10 at the rear. Within the chamber 9 is a clutch sleeve 11 adapted to slide upon the central core or mandrel 12. Its inner end has a flange 13 projecting inwardly to bear upon the core or guide axially of the chuck. The sleeve has at its forward end, a radially extending flange 14 which has a flattened forward face to fit against the cone 6 and has its periphery formed with a projecting lip 15 which is extended to engage within a groove 16 in the cone when said flange is expanded to thereby grip said cone and force said cone inwardly. The sleeve 11 is slotted at 17 from the inner end forwardly to and including the flanged portion 14, thus providing a flexibility in the sleeve. The forward inner side of the sleeve is beveled at 18 to contact with a beveled expanding member 19. The sleeve 11 is held normally forward out of gripping position by a spring 34 bearing at one end against the partition 9.

The guide core 12 is threaded at its forward end to engage with the beveled expanding ring 19, thus making the said expanding ring adjustable longitudinally thereon. The opposite end of the guide core is connected at 20 within a plug 21 which projects rearwardly beyond the end of the chuck body 1.

The plug 21 has its outer end recessed centrally to receive a nipple 22. Said nipple is of tubular construction fitting within the end of the plug. It has a radial flange 23 which is separated from the inner end of the recess by packing material 24. The nipple is held in place by a tubular nut 25 which tends to hold the nipple in place and is separated from the flange 23 by a washer 26. The nipple 22 is tubular, having its outer end threaded for connection with a pressure line through which fluid under pressure may be employed. The inner end thereof connects with the passage 27 leading to a radial duct 28 which connects with a chamber 29 within a pressure cylinder 30. The outer wall 36 of the cylinder comprises a plate attached to the cylinder by screws and making a loose fit at 32 about the plug 21 whereby fluid may find inlet or outlet as the piston 33 is moved therein.

Said piston is secured to the plug 21 just to the rearward side of the fluid passage 27 and is adapted to be acted upon by fluid pressure to move said plug and core.

In operation the tool 6 is placed over the forward end of the sleeve at 14 and fluid pressure is admitted to the chamber 29 to move the piston rearwardly. This will first move the ring 19 against the sleeve 11 expanding the flange 14 and gripping the tool. The tool is then drawn tightly into its seat 5 so as to make a close electrical contact with the body of the chuck. The current may then pass through the conductor 35 to the ring 4 and the body 1 to the tool which forms a terminal in welding cutting teeth upon said tool. When the fluid pressure is released the spring 34 acts to force said core 12 forwardly thereby allowing the sleeve 11 to retract the flange 14, releasing the tool.

The invention is adapted for use with particular tools whereon welding is being done, and is especially effective and convenient for that purpose.

What I claim as new is:

1. A tool-engaging chuck including a body having a forward tapered seat thereon, an axial guide core, a sleeve on said core having a radial tool-engaging flange thereon, a beveled expanding ring on said core, adapted to fit within said sleeve and means to move said core to force said ring within said sleeve to expand said sleeve into engagement with said tool, and to force said tool tightly into said seat.

2. A tool-engaging chuck including a body having a tool receiving seat thereon, an axial guide core, a sleeve on said core having a radial tool-engaging flange thereon, a beveled expanding ring on said core, adapted to fit within said sleeve and fluid pressure operated means to move said core inwardly to force said sleeve to grip said tool and move it tightly into said seat, and means to move said core to release said tool when said fluid pressure operated means is inoperative.

3. A tool-engaging chuck including a tubular body having a forward seat at its forward end, an axial core in said body, means to move said core inwardly, a sleeve slidable on said core, a flange on said sleeve adapted to be expanded to grip said tool, and means on said core, operative when said core is moved inwardly to expand said sleeve to grip said tool, and move it into said seat, and separate means to force said sleeve outwardly when said core is released.

4. A tool-engaging chuck including a body having a forward seat thereon, a central core in said body, a tool-engaging sleeve on said core, means on said core to expand said sleeve to engage said tool and to simultaneously move said sleeve inwardly, and means to release said sleeve and said tool.

5. A tool engaging chuck including a tubular body, an annular ridge on the forward end thereof, forming a seat, a central core in said body, means slidable on said core to engage the tool, and means to move said core to expand said tool engaging means, and move the work into said seat.

6. A tool engaging chuck including a tubular body, an annular seat on said body, a core in said body, an expansible sleeve slidable on said core to engage the work, means to move said core to expand said sleeve to engage the work, the movement of said core acting also to move the work into said seat.

7. A tool engaging chuck including a tubular body, an annular seat on said body, a core in said body, an expansible sleeve slidable on said core to engage the work, means to move said core to expand said sleeve to engage the work, the movement of said core acting also to move the work into said seat, and means to move said sleeve into retracted position to release the work.

In testimony whereof I hereunto affix my signature this 2nd day of July A. D. 1928.

SETH EVANS.